United States Patent [19]

Hergenrother et al.

[11] Patent Number: 4,806,322

[45] Date of Patent: Feb. 21, 1989

[54] PROCESS FOR THE PRODUCTION OF LINEAR POLYPHOSPHAZENES

[75] Inventors: William L. Hergenrother; James Oziomek, both of Akron, Ohio

[73] Assignee: The Firestone Tire & Rubber Company, Akron, Ohio

[21] Appl. No.: 122,311

[22] Filed: Nov. 16, 1987

[51] Int. Cl.$^4$ ............................................. C01B 25/10
[52] U.S. Cl. ........................................ 423/300; 528/399
[58] Field of Search ............................ 423/300; 528/399

[56] References Cited

U.S. PATENT DOCUMENTS

| | | | |
|---|---|---|---|
| 3,669,633 | 6/1972 | Beinfest et al. | 423/300 |
| 3,860,693 | 1/1975 | Graham | 423/300 |
| 4,225,567 | 9/1980 | Halasa et al. | 423/300 |
| 4,242,494 | 12/1980 | Hergenrother et al. | 528/399 |
| 4,327,064 | 4/1982 | Fieldhouse et al. | 423/300 |
| 4,551,317 | 11/1985 | Li | 423/300 |

FOREIGN PATENT DOCUMENTS

| | | | |
|---|---|---|---|
| 56130 | 4/1980 | Japan | 528/399 |
| 56129 | 4/1980 | Japan | 528/399 |

OTHER PUBLICATIONS

Allen, G., et al, Polymer, 11, No. 1, pp. 31–43 (Jan. 1970).

Primary Examiner—John Doll
Assistant Examiner—Wayne A. Lange
Attorney, Agent, or Firm—Frank J. Troy, Sr.; 12

[57] ABSTRACT

The present invention relates to a method of preparing linear polyphosphazene polymers by direct synthesis under anhydrous conditions from $NH_4Cl$ and at least one chlorophosporous compound selected from the group consisting of $PCl_5$, $XPCl_4$, or $X_2PCl_3$ wherein X is one or more substituents selected from the group consisting of $C_6H_5-$, $C_6H_4Cl-$, $C_6H_4F-$, $C_6H_4Br-$, $C_6H_2Cl_3-$, $C_6F_5-$, $C_6H_4CF_3-$, $C_6H_4NO_2-$, $Cl_3C-$, $F_3C-$, $F_5C_2-$, $F_7C_3-$, or $HC_2F_4-$. Each of these compounds may be prepared in situ in a reactor. The instant process controls the pressure in the reactor through continuous venting of by-product HCl at elevated pressures. The instant invention also utilizes an excess of of reactive solvent such as $PCl_3$, $XPCl_2$, or $X_2PCl$ as X is defined above.

13 Claims, No Drawings

PROCESS FOR THE PRODUCTION OF LINEAR POLYPHOSPHAZENES

BACKGROUND OF THE INVENTION

Previous methods of producing linear polydichlorophosphazene polymers centered around batch processes in which the cyclic trimer $(Cl_2PN)_3$ is converted to high molecular weight polymers via hydrolytic polymerization as disclosed in U.S. Pat. Nos. 3,515,688 and 3,370,020. The trimer is produced by reacting $PCl_5$ and $NH_4Cl$ followed by careful purification. The costs of preparation and the purification of cyclic trimer, $(Cl_2PN)_3$, may be avoided by a direct synthesis route, such that the final cost of producing substituted polyphosphazes, particularly for floor coatings and foams may be greatly reduced. It has previously been deemed impossible to directly polymerize $PCl_5$ and $NH_4Cl$ to produce linear polydichlorophosphazene. The only reported preparation of $(PCl_2N)x$ from $PCl_5$ and $NH_4Cl$ was in Polymer 11, pages 31, 43 (1970) which describes the accidental preparation of a soluble chloropolymer.

DETAILED DESCRIPTION OF THE INVENTION

The instant process relates to a method for preparing linear substituted polyphosphazene polymers containing units represented by the formula

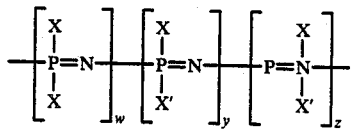

wherein X' is Cl, wherein X is the same as X' or is one or more substitutents selected from the group $C_6F_5-$, $C_6H_4CF_3-$, $C_6H_4NO_2-$, $Cl_3C-$, $F_3C-$, $F_5C_2-$, $F_7C_3-$ or $HC_2F_4-$, and $20 < (W+Y+Z) < 50,000$. The method of the present invention produces the above-identified polymer by the direct reaction of $NH_4Cl$ and at least one compound selected from the group consisting of $PCl_5$, $XPCl_4$ and $X_2PCl_3$ wherein X is defined above, in a reactor at controlled temperatures and pressures. During formation of the polymer the reaction vessel is vented to remove by-product HCl.

The instant process employs a plurality of steps, the first of which is the initial charging into a suitable stirred reactor in an oxygen free environment of an anhydrous mixture of approximately equimolar quantities of $NH_4Cl$ and a chlorophosphorous compound selected from the group consisting of $PCl_5$, $XPCl_4$ and $X_2PCl_3$. While the charging of the chlorophosphorous compound into the reactor contemplates the direct charging of the chlorophosphorous compound, it is preferable to form the chlorophosphorous compound in situ by conjoint charging of $Cl_2$ with an excess of $PCl_3$, $XPCl_2$ or $X_2PCl$ or mixtures thereof. The $Cl_2$ may be charged in total or sequentially at the reaction temperature. Sequential addition of $Cl_2$ may be employed to control the polymerization product. Thus, the chlorophosphorous compound is formed and the excess $PCl_3$, $XPCl_2$ or $X_2PCl$ which remains in the reactor serves as a solvent for the eventual solution polymerization of the chlorophosphorous compound and $NH_4Cl$. It is preferred that the total amount of $PCl_3$, $XPCl_2$ and $X_2PCl$ be used in excess in an amount ranging between 20 to 500 percent by weight of the final polymer content.

The $NH_4Cl$ which is charged into the reactor and reacted with the chlorophosphorous compounds may also be formed in situ by the conjoint addition of metered amounts of anhydrous $NH_3$ and anhydrous HCl. Approximately equal molar amounts of $NH_3$ and HCl should be conjointly added to the reactor so that excessive amounts of either compound are not present during the production of the polyphosphazene compounds.

Approximately equimolar quantities of chlorophosphorous compounds (ClPhos) and $NH_4Cl$ are herein defined as molar amounts of (ClPhos):$NH_4Cl$ ranging between 0.90:1.10 and 1.10:0.90, preferably 0.95:1.05 to 1.05 to 0.95, most preferably 0.99:1.01 to 1.01 to 0.99.

In the preferred embodiment of the instant invention $PCl_5$ is formed in situ by the reaction of anhydrous $PCl_3$ and anhydrous $Cl_2$. The $PCl_3$ is preferably present in excess as a reactive solvent and the final $PCl_5$ content is controlled by the amount of $Cl_2$ which is added into the reactor. The $Cl_2$ gas which is added is easily purified prior to addition to the reactor. Similarly, the $Cl_2$ is easily metered to control the final $PCl_5$ content in the reactor. While the foregoing discussion addressed the formation of $PCl_5$ from $PCl_3$, it is obvious that either $XPCl_2$ or $X_2PCl$ may be reacted in the same manner with $Cl_2$ to form the reactive components $XPCl_4$ and $X_2PCl_3$.

As the present invention contemplates the production of both polydichlorophosphazenes and phenyl substituted polychlorophosphazenes, either $X_2PCl$ or $XPCl_2$ may be substituted for part of the $PCl_3$ which is initially charged in excess to the reactor. These compounds also function as reactive solvents. The use of these phenyl substituted chlorophosphorous compounds promotes the addition of phenyl substituents to the polyphosphazene backbone thus producing polymers having increased thermal stability. Alternatively combinations of varying amount of $PCl_3$, $XPCl_2$ or $X_2PCl$ may be utilized in the instant invention to control the degree of non-chloro substitution along the polyphosphazene backbone.

Substituted chlorophosphorous compounds which may be reacted in situ with $Cl_2$ and utilized in the present invention include $PCl_3$, $XPCl_2$, and $X_2PCl$ Wherein X has previously been defined. Mixtures of different substituted chlorophosphorous compounds which provide varying backbone substituents are contemplated within the scope of the present invention. For example, a reactive charge of $PCl_3$, $C_6H_5PCl_2$ and $C_6H_4ClPCl_2$ may be employed together with a suitable amount of charged $Cl_2$. Preferred charged chlorophosphorous compounds for use in the present invention include $PCl_3$, $C_6H_5PCl_2$, $(C_6H_5)_2PCl$ or mixtures thereof.

The mixture of reactive compounds is then heated in the reactor to a temperature ranging from about 100° C. to about 300° C. while the pressure in the reactor is permitted to rise. The use of the higher temperatures in this range generally translates into shorter contact times and sharply elevated pressures in the reaction vessel.

As the linear polyphosphazene polymers are produced in the reactor, by-product HCl is also produced thereby contributing to sharply increasing pressure in the reactor. As the pressure of the reactor increases, primarily due to the generation of HCl, the rate of polymerization may decrease due to the presence of reaction inhibiting by-product HCl. Thus, the HCl produced during reaction of $NH_4Cl$ and the chlorophosphorous compounds in the reactor must be vented when the pressure initially reaches a range of approximately between 50 psig and a pressure of greater than 1,000 psig, preferably about 100 to 500 psig. The reactor should be continually vented of HCl as long as the pressure in the reaction vessel remains at or above approximately 50 psig. The venting of the HCl from the reactor is discontinued when HCl generation ceases from the reaction of $NH_4Cl$ and the chlorophosphorous compounds and the pressure stabilizes. Heating of the reactor is continued for a time sufficient to produce the desired molecular weight linear polyphosphazenes. In the event that only $PCl_5$ and $NH_4Cl$ are reacted a polydichlorphosphazene $(NPCl_2)n$ in Which n ranges from 20 to 50,000 is produced. The polydichlorophosphazene is then recovered in any suitable manner.

Typically, the chloropolymer is recovered from solution by vacuum stripping the excess reactive solvent or by coagulating the polymer with hexane or other compounds in which polydichlorophazenes or phenyl substituted polychlorophosphazenes are insoluble which are well known in the art.

The following examples of reaction procedures are not intended to limit the invention in any way but are merely exemplary preferred embodiments of the instant invention.

The five examples disclosed herein employed the following apparatus and procedures for the preparation of linear polydichlorophosphazenes. A 310 ml Parr bomb with a 2,000 psig gauge and rupture disk was used in a high pressure cell. The cell was equipped with remote air actuated valves which could be used for nitrogen purging and pressurizing or for venting of the reactor. The use of this system required that the manual valve of the bomb be opened before the reaction starts and all pressure controlling be performed from the other side of a reinforced wall by the use of remote valves. Heating tape was used to heat the valve of the bomb to a maximum of 320° F. and the bomb itself was heated in a beaker heating mantle. The reaction temperature was regulated by a 0°–800° C. controller connected to a Variac that supplied power to the heating mantle. The pressure could be followed by observation through a thick safety glass window.

The bomb was charged in a dry box by adding 33.32 g (0.160 moles) of $PCl_5$ and 8.56 g (0.160 moles) of freshly ground dry $NH_4Cl$ to a glass insert for the reactor. After sealing in the dry box, the bomb was attached to the remote valves connected to an NaOH scrubber for vent line. Heating to a temperature of 160° C. for two hours obtained a sufficient reaction. After observing the pressure increase and venting scheduled described below in the following examples for the times indicated, the bomb was cooled and opened in the dry box.

The products obtained were in two locations in the bomb. The desired product was an amorphous oil or rubber inside the glass liner and often accompanied by insoluble material generally confined to an upper skin and formed around unreacted ammonium chloride crystals. In the area between the glass liner and the bomb was a crystalline or pasty material that appeared to be cyclic trimer and oligomers. The soluble material may be separated from the gel by transferring to a 10 oz. bottle and adding about 100 cc of anhydrous solvent (toluene or THF). Pressure decanting when dissolution was complete gave a viscous solution which was characterized by viscosity and IR spectra. The viscosity was more conveniently run on a 1–1.5% toluene solution containing 0.75% of trioctylamine as a stabilizer. The maximum expected Yield of polymer was 18.54 g. A summary of the 5 examples is as follows.

EXAMPLE 1

In this example the ammonium chloride was slightly moist and the reaction was held under pressure for three hours before cooling and then venting. A slight HCl leak was observed. A total of 15.3 g (82.5%) of a yellow oil with $NH_4Cl$ crystals present were in the liner and 2.7 g (14.6%) of a slurry of a green semi-crystalline mass in contact with the steel. The major product was shown by Mass Spectroscopy to consist of low MW linear ionic polyphosphazene that slowly increased in MW upon standing. Gas chromatrographic analysis showed some trimer and higher cyclics but mainly other linear products. The oil was insoluble in cyclohexane and toluene but was soluble in chloroform and nitrobenzene. Washing with chloroform left an insoluble residue of 1.0 g $NH_4Cl$.

EXAMPLE 2

During the first two hours the anhydrous reagents were heated with an opened vent line to 170° C. This caused a partial plug to be formed in the vent line such that only 140–230 psig Was obtained. The reaction was continued for twenty-four hours at this temperature while the pressure was allowed to slowly vent. Upon opening, a solid, clear light brown rubber was in the liner: 12.90 g (69.6%) and 4.10 g (22.1%) of a semi-crystalline paste was in contact with the steel walls. All but 11.6% of the major product (61.5% overall) was soluble in toluene and had an inherent viscosity [n] 0.19 dl/g and an IR from a cast film identical to polydichlorophosphazene.

EXAMPLE 3

In this example the anhydrous $NH_4Cl$ was not ground and only 20 psig was generated after two hours at 170° C. A small leak of HCl was also observed but after an additional 2.5 hr., a pressure of 720 psig was observed. Venting to 110 psig and heating fifteen hours have an additional 30 psig increase. Complete venting and heating for a total of twenty-four hours gave 16.37 g (88.3%) of a viscous oil that was 1.36% gel (87.1% overall) and had an inherent viscosity of 0.02 dl/g. Another 0.94 g (0.51%) of a brown crystalline material was collected from outside of the glass liner.

EXAMPLE 4

A 2% increase in the amount of finely ground $NH_4Cl$ (0.0032 moles) was used with this example in a tightly sealed reactor. A maximum pressure of 720 psig was recorded 4 hrs. and 45 minutes from the beginning of the heating. After venting, an additional 90 psig was generated in the next three hours which after venting again increased 15 psig in the next fifteen hours. A total of twenty hours and forty-five minutes at 168°–170° C. was required for this reaction. A light yellow viscous sticky polymer was obtained from the glass liner, 15.01 g (81.0%). Heating of this polymer to 170° C. under a vacuum of 0.10 mm of Hg showed a weighto loss of 0.25 g after one hour. After cooling, the degassed solid was dissolved in toluene and left a residue of 0.81 g (5.5% of the sample) to give a total of 75.2% soluble polymer that had an inherent viscosity of 0.19 dl/g. An additional 2.54 g (13.7%) of a crystalline paste was collected inside of the bomb.

EXAMPLE 5

To this example was added 21.96 g (0.160 moles) of anhydrous PCl$_3$ as a solvent. The slurry produced was rapidly sealed into the bomb, but no pressure build-up was observed. Heating to 180° C. gave 705 psig in the first two hours which slowly increased to 910 psig upon heating for an additional four hours and twelve minutes. Venting slowly (30 min.) to 45 psig went smoothly, with the first 725 psig being lost in the first ten minutes. Heating at 180° C. for sixteen hours gave a pressure increase of 20 psig which was vented and the reaction stopped. Upon opening 13.44 g (72.5%) of a viscous, clear tan-yellow polymer was collected from the liner. Vacuum stripping showed a 0.50 g weight loss and a total of 0.55 g (3.0%) that was toluene insoluble. The soluble polymer which represents 12.39 g (66.8%) had an inherent viscosity of 0.43 dl/gm. In addition, 0.60 g (3.2%) of a tough white rubber containing NH$_4$Cl was removed from the side of the liner. Because of moisture exposure no solubility test was made on this sample. The material between the liner and the bomb was 3.2 g (17.S%) of a semi-crystalline paste.

The variations of conditions and procedures as well as the characteristics of the resultant products in Examples 1-5 are displayed in Table 1.

TABLE 1

| | Product Characteristics | | | | Reaction Conditions | | | Reaction |
|---|---|---|---|---|---|---|---|---|
| Example # | % Soluble Polymer | % gel + insol | % cyclics | [η] | Total Pressure | Time Hrs. | Temp. °C. | Procedures Variations |
| 1 | 71.1 | 5.4 | 14.6 | very low | 765 | 3.0 | 162 | damp NH$_4$Cl |
| 2 | 61.5 | 8.1 | 22.1 | 0.29 | 200 | 24 | 170 | vented run Cl$_2$ lost |
| 3 | 87.1 | 1.2 | 0.5 | 0.02 | 750 | 24 | 170 | NH$_4$Cl crystals |
| 4 | 75.2 | 4.4 | 13.7 | 0.19 | 825 | 20.7 | 170 | 2% excess NH$_4$Cl |
| 5 | 66.8 | 6.2 | 17.3 | 0.43 | 930 | 20.7 | 180 | PCl$_3$ added |

We claim:

1. A method for preparing linear polyphosphazene polymer containing units represented by the formula:

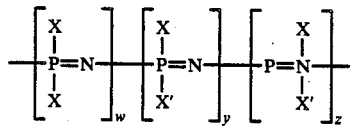

wherein X' is Cl and w herein X is the same as X' or is one or more substitutents selected from the group consisting of C$_6$H$_5$—, C$_6$H$_4$Cl—, C$_6$H$_4$F—, C$_6$H$_{Br}$—, CH$_6$H$_2$Cl$_3$—, C$_6$F$_5$—, C$_6$H$_4$CF$_3$—, C$_6$H$_4$NO$_2$—, Cl$_3$C—, F$_3$C—, F$_5$C$_2$—, F$_7$C$_3$— or HC$_2$F$_4$—, and 20<(W+Y+Z)=50,000 which comprises the steps of:

(a) charging into a reactor an anhydrous mixture of NHCl and at least one chlorophosphorous compound selected from the group consisting of PCl, XPCl$_4$ and X$_2$PCl$_3$ in a ratio of chlorophosphorous compound to NHCl ranging from 0.90:1.10 to 1.10:0.90 in the presence of solvent in excess of Cl$_2$ in an amount ranging from about 1 percent to 500% by weight of final polymer content, said solvent being selected from the group consisting of PCl$_3$, XPCl$_2$ and X$_2$PCl;

(b) heating the reactor to a temperature ranging from about 100° C. to about 300° C., thereby producing by-product HCl;

(c) venting the reactor to move by-product HCl;

(d) discontinuing venting of the reactor when by-product HCl generation ceases;

(e) continuing to heat the reactor for a time sufficient to produce said linear polyphosphazene polymer of desired molecular weight and (f) recovering said linear polyphosphazene polymer.

2. The method as defined in claim 1 wherein at least two different chlorophosphorous compounds are charged into the reactor.

3. The method as defined in claim 1 wherein the venting in step (c) is initiated when the pressure in the reactor reaches approximately 50 psig.

4. The method as defined in claim 1 wherein the NH$_4$Cl which is charged into the reactor comprises a reactive mixture of NH$_3$ and HCl.

5. The method as defined in claim 1 wherein the chlorophosphorous compound which is charged into the reactor comprises a reactive mixture of Cl$_2$ and at least one compound selected from the group consisting of PCl$_3$, XPCl$_2$ and X$_2$PCl.

6. The method as defined in claim 1 wherein the venting in step (c) is continuous when the pressure in the reactor exceeds 50 psig.

7. The method as defined in claim 1 wherein NH$_4$Cl is a mixture of NH$_3$ and HCl and the chlorophosphorous compound is a mixture of PCl$_3$ and Cl$_2$.

8. The method as defined in claim 1 wherein the polyphosphazene polymer is polydichlorophosphazene containing between 20 and 50,000 monomer units.

9. The method as defined in claim 1 wherein the chlorophosphorous compound which is charged into the reactor comprises a reactive mixture of Cl$_2$ and PCl$_3$.

10. The method as defined in claim 1 wherein the chlorophosphorous compound which is charged into the reactor comprises a reactive mixture of Cl$_2$, PCl$_3$ and at least one compound selected from the group consisting of C$_6$H$_5$PCl$_2$ and (C$_6$H$_5$)$_2$PCl.

11. The method as defined in claim 1 where said solvent is present in step (a) in excess of Cl$_2$ in an amount ranging from about 20 percent to 500 percent by weight of the final polymer content.

12. The method as defined in claim 1 wherein in step (a) the ratio of chlorophosphorous compound to NHCl charged ranges from 0.90:1.10 to 1.00:1.00.

13. The method as defined in claim 12 wherein in step (a) the ratio of chlorophosphorous compound to NHCl charged is 1.00.

* * * * *

UNITED STATES PATENT AND TRADEMARK OFFICE
CERTIFICATE OF CORRECTION

PATENT NO. : 4,806,322

DATED : February 21, 1989

INVENTOR(S) : William L. Hergenrother, et al.

It is certified that error appears in the above-identified patent and that said Letters Patent is hereby corrected as shown below:

Column 1, line 39

After group, insert --- consisting of $C_6H_5-$, $C_6H_4Cl$, $C_6H_4F-$, $C_6H_4Br-$, $C_6H_2Cl_3-$, ---

Column 1, line 40

"$C_6H_4NO2-$" should be --- $C_6H_4NO_2-$ ---

Column 5, line 54

" w herein" should be --- wherein ---

Column 5, line 57

"$C_6H_{Br}-$" should be --- $C_6H_4Br-$ ---

Column 5, line 58

"$CH_6H_2Cl_3-$" should be --- $C_6H_2Cl_3-$ ---

Column 5, line 62

"NHCl" should be --- $NH_4Cl$ ---

Column 5, line 63

"PCl" should be --- $PCl_5$ ---

Column 5, line 65

"NHCl" should be --- $NH_4Cl$ ---

UNITED STATES PATENT AND TRADEMARK OFFICE
CERTIFICATE OF CORRECTION

PATENT NO. : 4,806,322                                    Page 2 of 2
DATED      : February 21, 1989
INVENTOR(S) : William L. Hergenrother, et al.

It is certified that error appears in the above-identified patent and that said Letters Patent is hereby corrected as shown below:

Column 6, line 11

After weight, insert --- wherein linear polyphosphazene polymer produced exceeds cyclic product produced; ---

Signed and Sealed this

Twenty-second Day of August, 1989

Attest:

DONALD J. QUIGG

Attesting Officer            Commissioner of Patents and Trademarks